May 19, 1925.
W. J. SHERIDAN
1,538,521
SCRAPER FOR COOKING UTENSILS AND THE LIKE
Filed Nov. 24, 1924
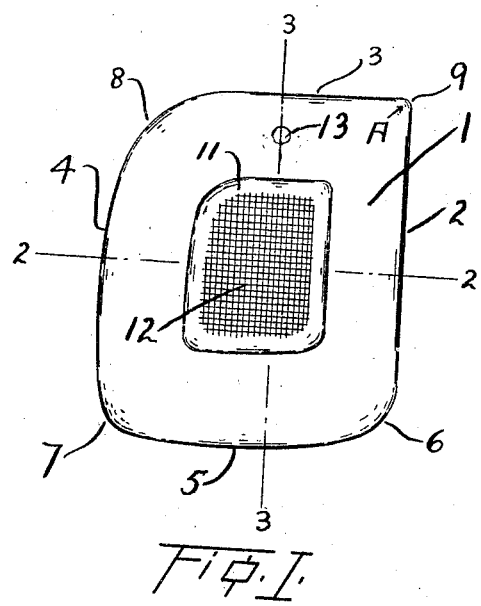
Fig. I.
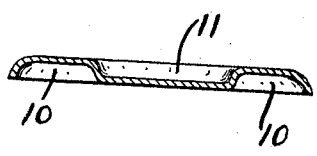
Fig. 2.
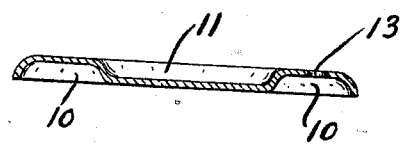
Fig. 3.
Inventor
William James Sheridan
by Lethuestonhaugh&Co
Attys.

Patented May 19, 1925.

1,538,521

UNITED STATES PATENT OFFICE.

WILLIAM JAMES SHERIDAN, OF HAMILTON, ONTARIO, CANADA.

SCRAPER FOR COOKING UTENSILS AND THE LIKE.

Application filed November 24, 1924. Serial No. 752,062.

*To all whom it may concern:*

Be it known that I, WILLIAM JAMES SHERIDAN, a subject of the King of Great Britain, and a resident of the city of Hamilton, in the county of Wentworth, Province of Ontario, Dominion of Canada, have invented certain new and useful Improvements in Scrapers for Cooking Utensils and the like, of which the following is a specification.

My invention relates to improvements in scrapers for cooking utensils and the like and the object of the invention is to devise an extremely simple, sanitary and inexpensive scraper by means of which grease, grit or other foreign matter may be conveniently and thoroughly removed from any portion of the surface of a cooking vessel or the like with a minimum of labor; a further object is to provide such a device which will be durable and which will not cut or otherwise damage the surface of the vessel and which will not cut or scratch the hands of the operator; a further object is to provide such a device by means of which all foreign matter may be effectively removed from all crevices or uneven portions of the surface of the vessel; and a still further object is to provide such a device which may readily be used with practically any shape of vessel.

Other objects will appear in the course of the following specification.

My invention consists essentially in a metal plate the entire periphery of which constitutes a scraping edge the contour of which is of peculiar form, all as hereinafter more particularly described and illustrated in the accompanying drawings, in which:—

Fig. 1 is a top plan view of a scraper constructed in accordance with my invention.

Fig. 2 is a section taken on the line 2—2 of Fig. 1.

Fig. 3 is a section taken on the line 3—3 of Fig. 1.

In the drawings, like characters of reference indicate corresponding parts in the different views.

My invention comprises a plate 1 which is preferably of copper although other suitable material might be used.

In the form of my invention illustrated, the plate 1 is formed with the two adjacent sides 2 and 3 straight and the angle at A included between these two sides is slightly less than a right angle.

The remaining sides 4 and 5 of the plate are curved outwardly and are of different curvature.

The sides of the plate merge into each other along curved arcs 6, 7, 8 and 9 and these arcs are all of different curvature.

The plate is dished at 10 so that the entire periphery thereof is downturned and forms a scraping edge (see Figs. 2 and 3) all of which lies in a common plane.

The central portion of the plate is formed with a reversely dished portion 11 and the bottom of this dished portion 11 lies in a common plane with the scraping edge of the plate.

The reversely dished portion 11 lies centrally of the plate and its contour conforms to the shape of the contour of the plate.

Both faces of the reversely dished portion 11 are pebbled or otherwise roughened at 12.

The plate is provided with a small orifice 13 for hanging same upon a nail or hook.

In using my improved scraper the reversely dished portion 11 is held between the thumb and fingers, the pebbled portions 12 on either face thereof facilitating the steady holding of the device.

The desired portion of the scraping edge is applied to the surface of the vessel, the scraper being in an inclined position with respect to said surface.

By pressing the scraping edge against the surface of the vessel and passing it back and forth thereover all grease, grit or other foreign matter is quickly and thoroughly loosened therefrom.

The straight portions 2 and 3 of the scraping edge are used on the flat surfaces of the vessel, while the curved portions 4 and 5 would be used on the moderately rounded portions and the curved corners 6, 7 or 8 on the more decidedly rounded or restricted portions as required.

In order to conveniently scrape vessels having rectangular corners the device is made so that the angle at A between the two straight sides 1 and 2 is slightly less than a right angle.

The scraper may also be effectively used with the bottom side up in the manner of a scoop as may be required in cleaning certain more inaccessible parts of a vessel or vessels of peculiar shape.

The dishing of the plate considerably increases the stiffness thereof and enables a much greater effective pressure to be applied at the scraping edge than would otherwise be the case.

The plate is made of copper, or other suitable material, which will not cut or damage the surface of the vessel being cleaned.

Due to the peculiar form of my improved scraper, it will be evident that it may be used to scrape vessels of practically all shapes and styles and by using the various portions of the scraping edge as desired practically all parts of the surface of a vessel may be effectively scraped.

The wear of the scraper is almost negligible and it will therefore be extremely durable.

The scraping edges are not sufficiently sharp, nor do they become sufficiently sharp with wear, to cut the hands of the operator, and since it is not necessary that the scraping edges be sharp, the device will, of course, never require sharpening.

The scraper may of course, be made in any size desired but it has been found that a comparatively small size is more convenient to hold and will probably prove more generally useful for the usual run of cooking utensils.

From the foregoing it will be clear that I have devised an improved article of the class described whereby the objects of my invention have been attained.

What I claim as my invention is:

1. A scraper for cooking utensils and the like, comprising, a dished metal plate, the entire periphery of which constitutes a scraping edge, and a reversely dished portion at the center of the plate.

2. A scraper for cooking utensils and the like, comprising, a dished metal plate, the entire periphery of which constitutes a scraping edge, a reversely dished portion at the center of the plate, the peripheral edges of the plate and the bottom of the reversely dished portion lying in a common plane.

WILLIAM JAMES SHERIDAN.

Witnesses:
JOHN G. HAYWARD,
JEAN SPARKS.